United States Patent

[11] 3,607,743

| [72] | Inventors | Pieter Visser;<br>Johannes Boom; Henricus G. J. Van Noesel, all of Amsterdam, Netherlands |
| --- | --- | --- |
| [21] | Appl. No. | 834,113 |
| [22] | Filed | June 17, 1969 |
| [45] | Patented | Sept. 21, 1971 |
| [73] | Assignee | Shell Oil Company<br>New York, N.Y. |
| [32] | Priority | June 18, 1968 |
| [33] | | Netherlands |
| [31] | | 6808575 |

[54] PROCESS FOR THE SEPARATION OF SOLIDS FROM A SUSPENSION THEREOF IN WATER BY MEANS OF AGGLOMERATION
10 Claims, 3 Drawing Figs.

[52] U.S. Cl................................................... 210/51, 210/219
[51] Int. Cl........................................................ B01d 21/01
[50] Field of Search............................................ 137/2, 93; 210/21, 42, 44, 49, 51, 59, 127, 143, 219, 538

[56] References Cited
UNITED STATES PATENTS

| Re. 22,194 | 6/1942 | Green............................ | 210/49 X |
| --- | --- | --- | --- |
| 2,441,200 | 5/1948 | Langhurst..................... | 210/21 |
| 3,129,717 | 4/1964 | Main et al...................... | 137/93 |
| 3,233,742 | 2/1966 | Shaines et al.................. | 210/49 X |
| 3,393,149 | 7/1968 | Conley et al................... | 210/51 X |

Primary Examiner—Reuben Friedman
Assistant Examiner—Thomas G. Wyse
Attorneys—Harold L. Denkler and Glen R. Grunewald ABSTRACT: A process is disclosed for the continuous agglomeration of solid particles from a suspension thereof in water by passing the suspension and a binding agent through an agglomeration zone in which a turbulent motion is maintained and adding binding agent to the agglomeration zone at varying rates responsive to the particle concentration of the aqueous stream flowing from the agglomeration zone.

INVENTORS:
PIETER VISSER
JOHANNES BOOM
HENRICUS G. J. VAN NOESEL

BY: *Glen R. Grunewald*

THEIR ATTORNEY

3,607,743

PROCESS FOR THE SEPARATION OF SOLIDS FROM A SUSPENSION THEREOF IN WATER BY MEANS OF AGGLOMERATION

BACKGROUND

The precess of removing particles from an aqueous stream with a binder is frequently employed, for example to remove soot from water in which it is suspended by the formation of agglomerates with oil or bitumen as a binding agent. The binding agent expels the water from the surface of the particles concerned, after which these particles on contacting one another stick together. Contact between particles and binders is promoted by maintaining a mixture of binding agent and the suspension turbulent. In addition to a binding agent a surface active agent may be an important auxiliary substance in the agglomeration process. Such a substance is capable of rendering the solid particles hydrophobic. The solid particles can also be made oleophilic. In either case expulsion of water by the binding agent is promoted.

An appropriate choice of auxiliary substance further permits the selective agglomeration of one solid from a mixture of fine particles of various solids, and the removal from the agglomeration zone of the other solids together with the water. Thus, for example, coal fines can be separated from stone chippings, the latter being carried off with the water.

The turbulent motion in the agglomeration zone can be created by an agitator. A highly suitable agglomeration zone is constituted by the annular space between two cylindrical surfaces having the inner cylindrical surface rotating about its axis. Such an agglomeration zone acts as a plurality of stages and short circuiting between the inlet to and the outlet from the zone is avoided whereby the agglomerates of uniform size are produced.

Of major importance is a correct proportioning of the auxiliary substance, and of the binding agent. This is the more important if the water leaving the agglomeration zone should no longer be contaminated with the solid to be agglomerated. Even a low concentration of such a substance, for example soot or coal in water, will give the water a very dirty appearance. Nor is it desireable to run off solid particles with the water if the solid concerned is highly valuable. In the event of varying quantities of solid particles in the suspension to be processed this proportioning is very difficult.

THE INVENTION

This invention provides an agglomeration process that can be carried out continuously by means of a simple and effective control of the supply of binder and auxiliary substance.

For the continuous agglomeration of one or more solid substances from a suspension thereof in water, the suspension and one or more agglomeration-promoting auxiliary substances, including at any rate a binding agent, are passes according to the invention through an agglomeration zone in which a turbulent motion is maintained and in which a. a concentration is measured of one or more of the solid substances to be agglomerated and present in water originating from the agglomeration zone;
b. the discharge of agglomerates from the agglomeration zone is controlled in such a manner that a certain quantity of agglomerates is invariably present therein;
c. the supply of binding agent is provided discontinuously in a quantity which is at most equal to the maximum quantity which can be bound by the agglomerates and the solid substances present in the agglomeration zone, the supply each time being supplied or increased temporarily when the measurement according to (a) exceeds a predetermined value, whereupon the supply is stopped or reduced as soon as this quantity of binding agent has been added. In other words, the binding agent may be added to the agglomerating zone completely batchwise, or it may be added continuously in quantities much less than needed with the remainder added batchwise.

In the explanation which follows reference will mainly be made to soot suspended in water and to be agglomerated with a heavy oil but the process according to the invention is by no means limited thereto.

Given a constant flow of soot-containing water, in which the concentration of soot remains constant, the agglomeration process can be carried out with a predetermined flow of oil in such a manner that the water leaving the agglomeration zone no longer contains any soot. To this end the soot/oil ratio can be varied to a limited extent.

It has now been found that fluctuations in the supply of soot make it extremely difficult for the supply of oil to be controlled in such a manner that the effluent water no longer contains any soot. Application to the soot agglomeration process of the usual principle from control engineering, i.e. using an increased supply of oil when the concentration of soot in the effluent water rises, and a decreased supply of oil when this concentration diminishes is not successful. A process according to this principle, the use of which for an agglomeration process is in any case not known, gives an unsatisfactory result in that dirty water always runs off, because this control system can only operate if the measured value for the concentration fluctuates about an equilibrium value that must be higher than zero. If the agglomeration process must be controlled to produce suspensions having a low soot content, the objective of obtaining pure water cannot be achieved, and this disadvantage makes an unacceptable process.

With the process according to the invention, the supply of binding agent is effected wholly or partly batchwise, and agglomerates are invariably present in the agglomeration zone. After the temporary supply or the temporary increase in the supply of binding agent the agglomerates present are relatively fat, i.e. an excess of binding agent is present. Such agglomerates are then capable again of absorbing a certain quantity of soot. After the temporary supply or the temporary increase in the supply of binding agent soot particles cannot escape, and the water originating from the agglomeration zone contains no soot. If the suspension entering the agglomeration zone contains only very little soot and if the quantity of fat agglomerates in the agglomeration zone is large, the binding of soot may continue for a relatively long time without necessity of adding more binding agent. This is further promoted by repeatedly supplying a substantial excess of binding agent for short periods. Under these conditions the soot concentration analyzer need only distinguish between no soot and a certain low concentration of soot in the water. The duration of the supply or of the increased supply of binding agent after the measurement of a certain concentration of soot in the water is not determined by the lower results of these measurements, but is predetermined, namely in such a manner that at most a maximum quantity of binding agent to be bound by the agglomerates is supplied. The supply of binding agent can be effected by supplying continuously at most 90 percent of the quantity required and by repeatedly increasing this quantity temporarily to at least 120 percent and at most 2,000 percent of the quantity required. The term required quantity is here defined as the quantity which it is desired to use on an average per unit of time in order to agglomerate the quantity of solid substance provided per unit of time. The quantity of binding agent to be supplied continuously will be selected lower than 90 percent according as the expected fluctuations in the supply of solid substance to be agglomerated are greater. In the event of continuous supply of at most 90 percent the water leaving the agglomeration zone will not be free from solid substance. The duration of the temporary increase can be selected within wide limits. The upper limit is determined by the quantity which can be bound by the agglomerates present. If the maximum possible quantity is selected for the quantity to be temporarily supplied, the longest intervals between two temporary increases are obtained, which has the advantage that the water leaving the agglomeration zone is consistently pure for a long time.

It is pointed out that although the upper limit of 2,000 percent would seem high, the maximum quantity to be bound need not be exceeded if this increased supply is of short duration. If the increased supply is of very short duration the upper limit may be even more than 2,000 percent. However, in this case difficulties may arise in that an excessive displacement of suspension may occur.

The supply of binding agent can also be effected by repeatedly supplying temporarily at least 120 percent and at most 2,000 percent of the quantity required. Thus, there is no continuous supply of binding agent. Here again the supply in each case of the maximum possible quantity is favorable.

Any additional agglomeration-promoting auxiliary substance (s) may be supplied simultaneously and in the same ratios to the binding agent. The agglomerates may occupy 0.1–40 percent of the volume of the agglomeration zone. If the concentration of solid particles in the suspension is low, for example 100 p.p.m. of soot in water, 0.1 to a few percent will suffice. Nevertheless, if a higher percentage is selected, very long intervals can be obtained between two temporary supplies or increased supplies of binding agent.

Owing to the supply of binding agent existing agglomerates grow in size and fresh agglomerates are also formed which are initially small. Agglomerates will constantly have to be carried off.

The quantity of agglomerates in the agglomeration zone can be maintained at a desired level by arranging for a continuous discharge of agglomerates from the agglomeration zone by running off the water from the agglomeration zone through a constriction in that zone. In this way only a portion of the agglomerates will be carried along.

The discharge of the agglomerates can also be effected discontinuously, for example by temporarily opening a valve.

The effect of carrying out the discharge over a short period of time during the temporary supply of binding agent is that agglomerates with a minimum content of binding agent are carried off. The inlet for binding agent is far removed from the outlet for agglomerates, so that if the discharge of agglomerates is of short duration, the supplied binding agent has not yet widely spread over the agglomeration zone.

The concentration of the solid particles to be agglomerated is measured in the water flow leaving the agglomeration zone. This in fact is the flow which is discharged or reused and which it was desired to purify. However, it may be an advantage to use for this measurement of flow of water originating from the agglomeration zone before the discharge thereof. In an oblong agglomeration zone the concentration of finely divided solid substance will invariably diminish in the direction of the water outlet. As long as the agglomerates present are still capable of absorbing solid substance, the water in a particular part of the agglomeration zone will be free from solid substance to be agglomerated. However, the border between dirty and pure water gradually moves towards the water outlet. By taking for measuring purposes a flow of water, originating from the agglomeration zone before the end thereof, for example from the middle section of the agglomeration zone, advance warning is received that dirty water is on its way out and biding agent will consequently be added at the right moment so that the water leaving the agglomeration zone contains very little soot, or none.

If necessary, the flow of water to be used for the measurement will have been previously freed completely from agglomerates. This may be effected by filtration of alternatively by means of a special apparatus to be described hereinafter.

During the short periods when too high a concentration of solid particles in the water leaving the agglomeration zone is indicated by the analyzer, this flow of water can be recirculated. This will only be necessary for a short time. In this way the advantage gained is that the water running off is never dirty.

As explained in the foregoing the process according to the invention is suitable for the removal of suspended soot from water, using a hydrocarbon oil as binding agent. Soot suspended in water is obtained for example by gasifying hydrocarbons by means of incomplete combustion. For this purpose the process according to the invention can be used to advantage. Especially in the production of synthesis gas from natural gas or refinery gas the process according to the invention is attractive in that under these conditions the soot content of the water flow is low so that it is difficult to proportion the supply of binding agent accurately without supervision.

An apparatus suitable for carrying out the process according to the invention may consist of a vessel comprising one or more agitators, which vessel is provided with an inlet for the suspension, an inlet for the binding and auxiliary substances, an outlet for water and an outlet for agglomerates formed, the apparatus being further provided with a. an analyzer for the concentration of one or more of the solid substance to be agglomerated and present in water originating from the agglomeration zone;
b. a valve or a constriction in the discharge for formed agglomerates;
c. an element for adjusting the temporary supply or the temporary increase in supply of binding and auxiliary substances on the instructions of the analyzer referred to under (a).

The said analyzer may be a light-absorption meter. In the case of soot in water a flow-through cell with an optical path of 10 cm. is found to operate satisfactorily. The variation is transmitted light upon variation of the soot content can be converted into an electric signal by means of a light-sensitive element.

The element in the supply for binder and auxiliary substances can be a valve. This valve can be operated by hand on the instructions of the analyzer mentioned previously. Much more attractive is an automatic control circuit consisting of the analyzer referred to above, which analyzer is connected to a controller, the output of which is connected to the said element which is further provided with a component having an adjustable mechanism for timing the temporary supply or the temporary increase in supply of the binder and auxiliary substances. The controller compares the signal for the measured value with a set value. The output signal of the controller is abruptly changed as soon as the measured value exceeds the set value. This permits a valve to be set in a new position and to be maintained in this position for a predetermined time. To this end use can be made of a locking relay with adjustable time constant. The element in the supply for the binder and auxiliary substances may also be a pump driven by an electric motor. In this case the control comprises putting the pump into operation for a specified time or temporarily increasing the output of the pump, for example by raising its speed.

The valve or the constriction in the discharge for formed agglomerates serves for retaining a certain quantity thereof in the agglomeration zone. By repeatedly opening the valve for short periods it is possible to discharge a portion of the formed agglomerates. In the case of continuous operation the duration and the frequency of the opening action determine the amount of agglomerates retained in the agglomeration zone. The opening action of the valve can be coupled to the action of the controller referred to above. The recirculation of water during the short time in which the meter records solid particles in the flow of water leaving the agglomeration zone can also be coupled to the action of the controller referred to previously. In this case the presence of a recirculation line with valve is required. The measurement of the concentration of solid particles to be agglomerated and present in water originating from the agglomeration zone must not be contaminated with agglomerates or fragments thereof. For this purpose use can be made of a separator in the water flow to the said analyzer for separating agglomerates or fragments thereof so that a water flow is obtained which only contains suspended solid particles. A separator of this type may consist of a filter capable of retaining agglomerates, a wide collecting tube for water originating from the filter, which tube is provided at its lower end with an outflow opening which is connected to the said analyzer, and which tube is also provided with a lateral tube with siphoning action arranged about midway the wide collecting tube, the outflow opening of this lateral tube being larger than the opening at the lower end of the collecting tube. It was found that fragments of agglomerates can pass through the filter. In some cases a narrower mesh filter might retain very small fragments but a filter of this type would become clogged too rapidly. The fragments collect at the surface of the water in the wide collecting tube. They are periodically removed from this tube because the upper part of the collecting tube is constantly being emptied by the siphoning action of the lateral tube.

For this purpose use can also be made of a collecting tube provided at its lower end with an outflow opening which is connected to the analyzer referred to above, which outflow opening is designed to discharge less water than flows into the tube through the filter. As a result water will constantly flow away over the upper edge of the tube, which water can be collected in a gutter and removed. Together with the water floating fragments are carried off as well.

The invention will now be elucidated with reference to the accompanying drawings.

Figure 1:
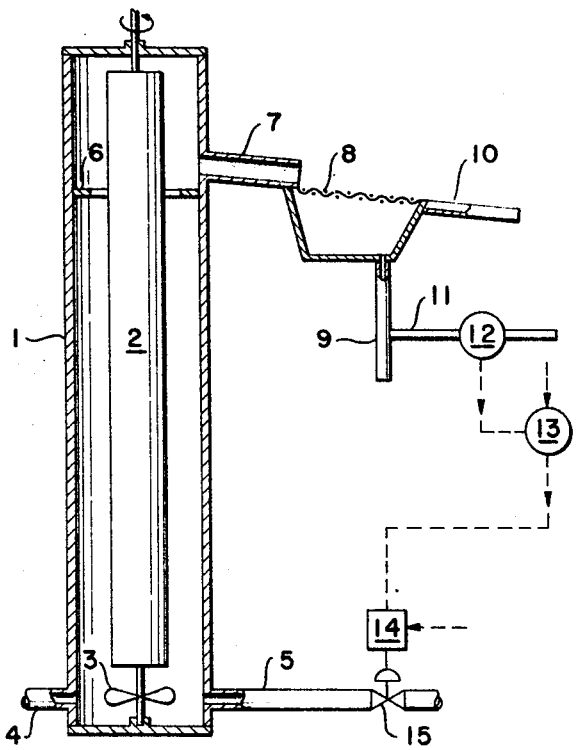
FIG. 1 shows schematically and partly in cross section a longitudinal cross section of a pelletizer with control scheme.

Referring to FIG. 1, the numeral 1 is a cylindrical casing within which a cylinder 2 is coaxially arranged and is capable of rotating about its axis. In coaxial relationship with the cylinder 2 an agitator 3 is provided. The suspension in water of one or more of the solids to be agglomerated is supplied by means of an inlet 4. The binding agent, possibly together with one or more auxiliary substances such as a surface active agent is added by means of an inlet 5. The agglomeration zone is contained within the cylindrical casing 1. The contents of the agglomeration zone are brought into turbulent motion by means of the agitator 3 and the cylinder 2, as a result of which agglomeration takes place. A baffle 6 with a central opening constitutes a constriction in the passage of water with agglomerates to an outlet 7. This will ensure the constant presence in the agglomeration zone of a certain quantity of agglomerates. Water is separated from agglomerates by means of a filter 8. Water flows off through an outlet 9 and agglomerates are discharged via a guiding element (tube or gutter) 10. The filter 8 may be a shaking filter to facilitate the forward movement of the agglomerates.

By means of a lateral tube 11 water originating from the agglomeration zone is passed to an analyzer 12 for measuring the concentration of any solid particles to be agglomerated. A signal corresponding with the measured concentration is passed to a controller 13, where this signal is compared with a set value. The output signal of the controller 13 is passed via an element 14 to an adjusting element or valve 15 in the supply 5 for binding agent. If the value measured by the analyzer 12 becomes higher than the set value of the controller 13, the output signal of the controller 13 changes as a result of which the valve 15 is opened or further opened. The new position of the valve 15 is maintained for some time by the element 14 irrespective the course of the output signal of the controller 13 which will return to its original value. The temporizing action of the element 14 is adjustable. This element may contain an electronic clockwork mechanism. During this time the quantity of binding agent added or added extra is such that the agglomerates present in the agglomeration zone receive an excess of binding agent. They are then capable of binding newly arriving solid particles for a substantial time. In this case the water flowing out of 9 will be pure. The water required for the analyzer 12 can be obtained via a filter from a lateral tube fitted to the cylindrical casing 1, namely at a point below the outlet 7.

For the temporary recirculation of water leaving the agglomeration zone and containing solid particles the apparatus is provided with a line between the outlet 9 and the inlet 4, which line contains a valve. The valve is opened as long as the analyzer 12 records too high a valve. For this purpose use can be made of a relay or a controller. This possibility is not shown in the Figure.

Figure 2:
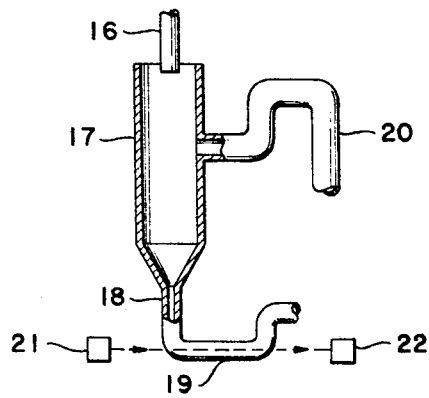
FIG. 2 shows a schematic longitudinal partial cross section of a measuring device for the concentration of one or more of the solid substances to be agglomerated and present in water originating from the agglomeration zone.

In FIG. 2 a tube 16 corresponds with the lateral tube 11 in FIG. 1. The water flowing out of the tube 16 enters a wide collecting tube 17. A continuous flow of water is passed to a cell 19 via an outflow opening 18. This water flow is part of the quantity flowing out of 16. If the level of the water in the collecting tube 17 rises above the highest point of a lateral tube 20 with siphoning action, the outflow opening of which lateral tube is wider than 18, a quantity of water from the tube 17 is carried off rapidly until the siphon runs empty. Fragments of agglomerates which sometimes pass through by the filter 8 are subsequently carried off via the lateral tube 20.

A light source 21 is arranged before the cell 19. The beam of light emanating from the cell 19 is measured by means of a cell 22. In this way the presence of suspended solid substance which is not agglomerated is established immediately. The parts 21, 19 and 22 together constitute the analyzer 12 of FIG. 1.

Figure 3:
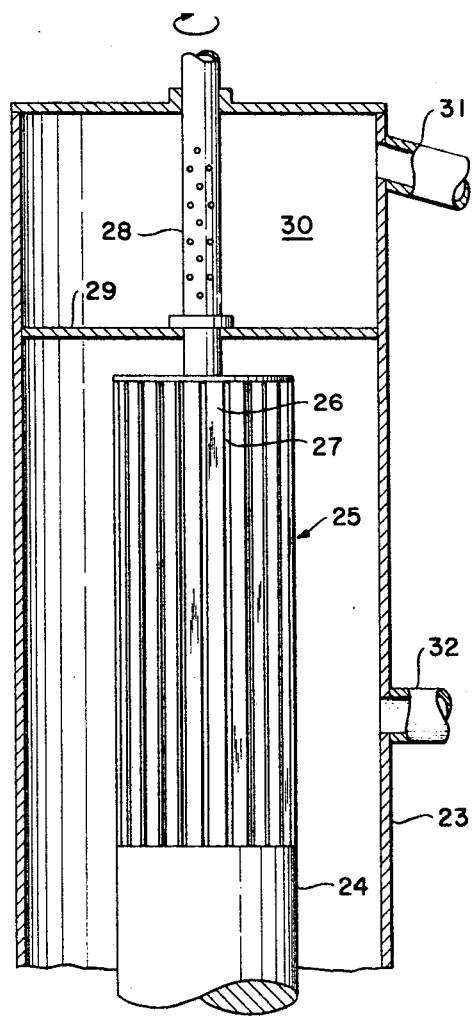
FIG. 3 shows a schematic longitudinal partial cross section of a specially constructed pelletizer.

FIG. 3 shows an alternative for a pelletizer by means of which the quantity of agglomerates present in the agglomeration zone can be adjusted.

FIG. 3 shows the outlet side of a pelletizer. In this pelletizer the numeral 23 represents the cylindrical casing and the numeral 24 the rotatable cylinder. Secured to the cylinder 24 in coaxial relationship therewith is a hollow portion 25 provided with oblique baffles 26 leaving slits 27. The hollow portion 25 issues into a tube 28 provided with holes. A partition 29 defines a space 30 with an outlet 31 for water. Water from the agglomeration zone enters the hollow cylinder portion 25 via the slits 27 and leaves the pelletizer via the tube 28, the space 30 and the outlet 31. The rotating movement of the portion 25 causes some of the water to be flung back again as a result of which a screen of water is formed around the baffles 26. In this way agglomerates cannot come into contact with the baffles 26 so that they are not reduced to fragments. The agglomerates remain in the agglomeration zone. An outlet 32 is provided which can repeatedly be opened for short periods so that some of the agglomerates can be maintained at a desired average value.

EXAMPLE

A pelletizer as represented by FIG. 1 with an agglomeration zone having a capacity of 2 liters was used for the continuous treatment of a suspension of soot in water. The soot content was approximately 100 p.p.m. The rate of supply of the suspension was varied between 10 and 30 liters/hour at a temperature of 85° C. A heavy oil was used as binding agent. The binding agent was supplied batchwise, with shots at a rate of 0.1 liters/hour lasting two minutes at intervals varying from 20 to 40 minutes. The supply was effected by causing a pump to operate as soon as the light absorption meter in the outgoing water flow detected a trace of soot of approximately 2 p.p.m. The operating time of the pump was controlled by an electronic clockwork mechanism. Obtained were agglomerates with a diameter of 1 to 2 mm.

We claim as our invention:

1. A process for the continuous agglomeration of solid particles from a suspension thereof in water by passing the suspension and a binding agent through an agglomeration zone in which a turbulent motion is maintained, comprising:
   a. measuring the concentration of the solid particles to be agglomerated and present in water originating from the agglomeration zone;
   b. controlling the discharge of agglomerates from the agglomeration zone to maintain a certain quantity of agglomerates invariably present therein;

c. supplying binding agent or of a portion thereof discontinuously in a certain quantity which is at most equal to the maximum quantity which can be bound by the agglomerates and the solid particles present in the agglomeration zone, each period of supply or increased supply beginning when the measurement according to (a) exceeds a predetermined value, whereupon the supply is stopped again or reduced as soon as this certain quantity of binding agent has been added.

2. A process as claimed in claim 1, wherein the supply of binding agent is affected by supplying continuously at most 90 percent of the quantity required and by repeatedly increasing this quantity temporarily to at least 120 percent and at most 2,000 percent of the quantity required.

3. A process as claimed in claim 1, wherein another agglomeration-promoting auxiliary substance is added to the agglomerating zone simultaneously and in the same ratio to the binding agent.

4. A process as claimed in claim 1, wherein agglomerates occupy 0.1–40 percent of the volume of the agglomeration zone.

5. A process as claimed in claim 1, wherein the discharge of agglomerates from the agglomeration zone is effected continuously by running passing water form the agglomeration zone through a constriction in that zone.

6. A process as claimed in claim 1, wherein the discharge of agglomerates from the agglomeration zone is effected discontinuously.

7. A process as claimed in claim 6, wherein the discharge is effected for a short time during the temporary supply of binding agent.

8. A process as claimed in claim 1, wherein said measurement is carried out in a flow of water originating from the agglomeration zone before the end thereof.

9. A process as claimed in claim 1, wherein said measurement is carried out in a flow of water which is previously freed completely from agglomerates.

10. A process as claimed in claim 1, wherein the water flow leaving the agglomeration zone is recirculated as long as the result of said measurement exceeds a predetermined value.